United States Patent [19]
Bentley

[11] Patent Number: 5,879,214
[45] Date of Patent: Mar. 9, 1999

[54] CONVERTIBLE FLOATING AND SLEDDING TOY

[76] Inventor: Harry Douglas Bentley, 154 Simmons Road, Woodbridge, Ontario, Canada, L4L 1A7

[21] Appl. No.: 866,294

[22] Filed: May 30, 1997

[51] Int. Cl.$^6$ ..................................................... A63B 31/11
[52] U.S. Cl. ............................ 441/65; 441/130; 280/22.1
[58] Field of Search ................................... 441/65, 66, 72, 441/130; 472/8, 9, 13, 14, 27; 280/22.1

[56] References Cited

U.S. PATENT DOCUMENTS

| | | |
|---|---|---|
| 3,142,285 | 7/1964 | Sorrentino et al. . |
| 3,372,667 | 3/1968 | Sweet . |
| 3,384,047 | 5/1968 | Remley . |
| 3,509,584 | 5/1970 | Sable . |
| 3,841,649 | 10/1974 | McMullen ............................... 280/21.1 |
| 4,115,888 | 9/1978 | Sievers . |
| 4,281,995 | 8/1981 | Pansini . |
| 4,681,550 | 7/1987 | Koenig . |

*Primary Examiner*—Jesus D. Sotelo
*Attorney, Agent, or Firm*—Paul J. Field

[57] ABSTRACT

A convertible toy that can be ridden by a child alternatively: (i) floating on water in a swimming pool or (ii) downhill sledding on snow covered hills. The toy has an elongate hull for buoyantly floating the toy and child on a water surface, and for sliding downhill on a frozen snow covered hill surface. For example, the hull may be a hollow blow molded plastic body with downwardly extending ribs having a flat bottom surface. Handlebars are mounted to a steering shaft housed within the hull for steering the direction of the toy. The steering shaft can be releaseably mounted with a water jet nozzle and alternatively with a snow riding ski. The toy mimics both a snowmobile and a jet-powered watercraft, for use in summer and winter. The water jet nozzle is supplied with pressurized water from a swimming pool filtration system via a flexible hose.

13 Claims, 5 Drawing Sheets

CONVERTIBLE FLOATING AND SLEDDING TOY

TECHNICAL FIELD

The invention is directed to a convertible toy for riding by a child floating on water and downhill sledding through quick interchange of lower portions of the steering mechanism.

BACKGROUND OF THE ART

Injection molded plastic toys are commonly purchased in the form of sleds, floating toys and many other shapes. For downhill sledding on frozen snow or ice covered hills, various plastic sleds have been used for many years. The plastic base or hull of the sleds provides a slippery surface superior to wood or aluminum with less risk of harm in case of accident.

For use in swimming pools various inflatable toys are conventional as well as more expensive injection molded boats or polyurethane foam toys of various shapes.

A disadvantage of purchasing such relatively expensive floating toys is that in northern climates the period of use is very limited. A typical outdoor pool may be used for less than four months, especially by smaller children.

The situation is similar with more expensive sledding toys which can be used for three or four months depending on the location. Modern sleds have become more complex and expensive with steering handlebars, skis and seats to mimic motorcycle riding.

Such expensive toys require extended periods of storage and since children outgrow riding toys very quickly, the commercial success of these toys is limited.

In the design of toys, especially riding toys, it is common to mimic the look and operation of real vehicles. For example, floating toys mimic real boats, and sleds and bicycles mimic real motorcycles. In some cases the mimicking is enhanced by the licensing of trademarks from a real manufacturer to the toy manufacturer, as in the case of toy Jeep trucks for example.

Many manufacturers of small or recreational motorized vehicles produce several types of vehicles. For example, it is not uncommon for a single manufacturer to produce some or all of the following vehicles: snowmobiles, jet skis, motorcycles, outboard motors and four wheel all terrain vehicles.

It is desirable therefore to extend the useful life of such relatively expensive toys, to improve the value of the such purchases and extend enjoyment by the child.

DISCLOSURE OF THE INVENTION

The invention provides a novel convertible toy for riding by at least one child while selectively floating on water and downhill sledding, the toy comprising: elongate hull means for buoyantly floating the toy and child riding thereon on a water surface, and for sliding the toy and child downhill on a frozen surface; and steering means housed within the hull for steering the direction of the toy by said child, the steering means including a common human interface portion releasably connected with mounting means to an interchangeable contact portion, the contact portion being selected from the group consisting of: water propulsion means; and a ski.

To switch between use as a sled and use as a boat the user need only interchange the lower part of the steering mechanism from a ski to the water propulsion system.

The water propulsion means comprises: a water jet nozzle mounted to the interface portion of the steering means; and a flexible hose, a first end releaseably connectable with the nozzle and a second end releaseably connectable to an external source of pressurized water. It is contemplated that commercial embodiments of the invention will include water propulsion means comprising velocity control valve means for manually controlling the flow of water to the water jet nozzle and the second end of the hose being releaseably connectable to the water filtration system of a swimming pool.

The invention enables the toy to be converted quickly from summer use as a floating toy on which a child may ride in a swimming pool, to a winter use as a sledding toy on which a child may ride downhill.

Since various snowmobile manufacturers also produce jet ski vehicles, it is contemplated that a commercial embodiment of the invention will mimic both vehicles. The winter use will include a single forward ski steerable with handle bars similar to a snowmobile. The summer use will include water jet propulsion also steerable with handlebars similar to a jet ski vehicle. In both cases of the real vehicle and toy mimic the rider sits straddled on a central bench seat with feet resting on foot pads.

Further details of the invention and its advantages will be apparent from the detailed description and drawings included below.

BRIEF DESCRIPTION OF THE DRAWINGS

In order that the invention may be readily understood, a preferred embodiment of the invention with two variations of contact means will be described by way of example, with reference to the accompanying drawings wherein:

FIGS. 1–5 show an embodiment of the invention configured for sledding, whereas

FIG. 1 is a top plan view of the hull with handle bar steering means attached to a steerable forward ski;

FIG. 2 is a front elevation view along line 2—2 of FIG. 1;

FIG. 3 is a right side elevation view of the hull of FIG. 1;

FIG. 4 is a rear elevation view along line 4—4 of FIG. 1;

FIG. 5 is a sectional view along line 5—5 of FIG. 1 showing a ski releaseably mounted to the lower end of the steering shaft;

FIG. 6 is a right side elevation view of the invention configured for use as a floating toy within a swimming pool with a water propulsion jet nozzle mounted on the lower end of the steering shaft and hose connecting to the pressurized water of the pool filtration system; and FIG. 7 is a sectional view similar to FIG. 5 with the ski removed and replaced with a water jet nozzle and pressurized water supply hose.

DETAILED DESCRIPTION OF PREFERRED EMBODIMENTS

Figure 2:
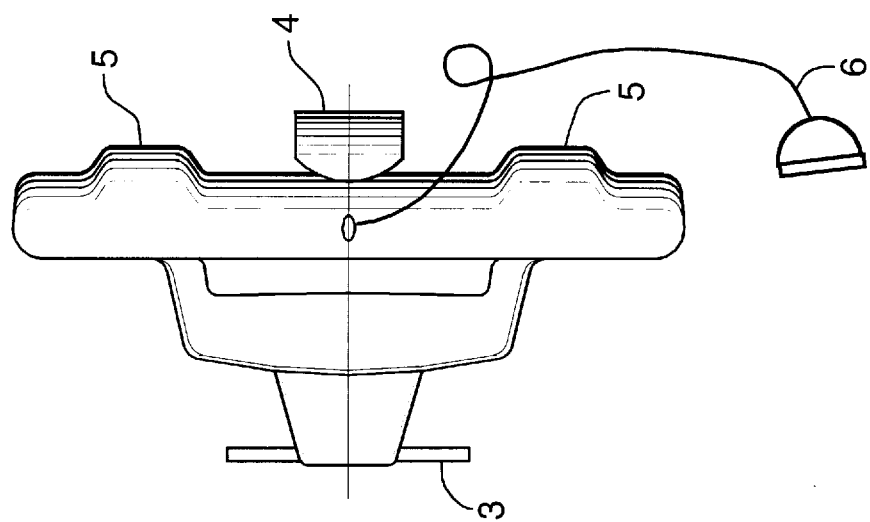
Figure 1:
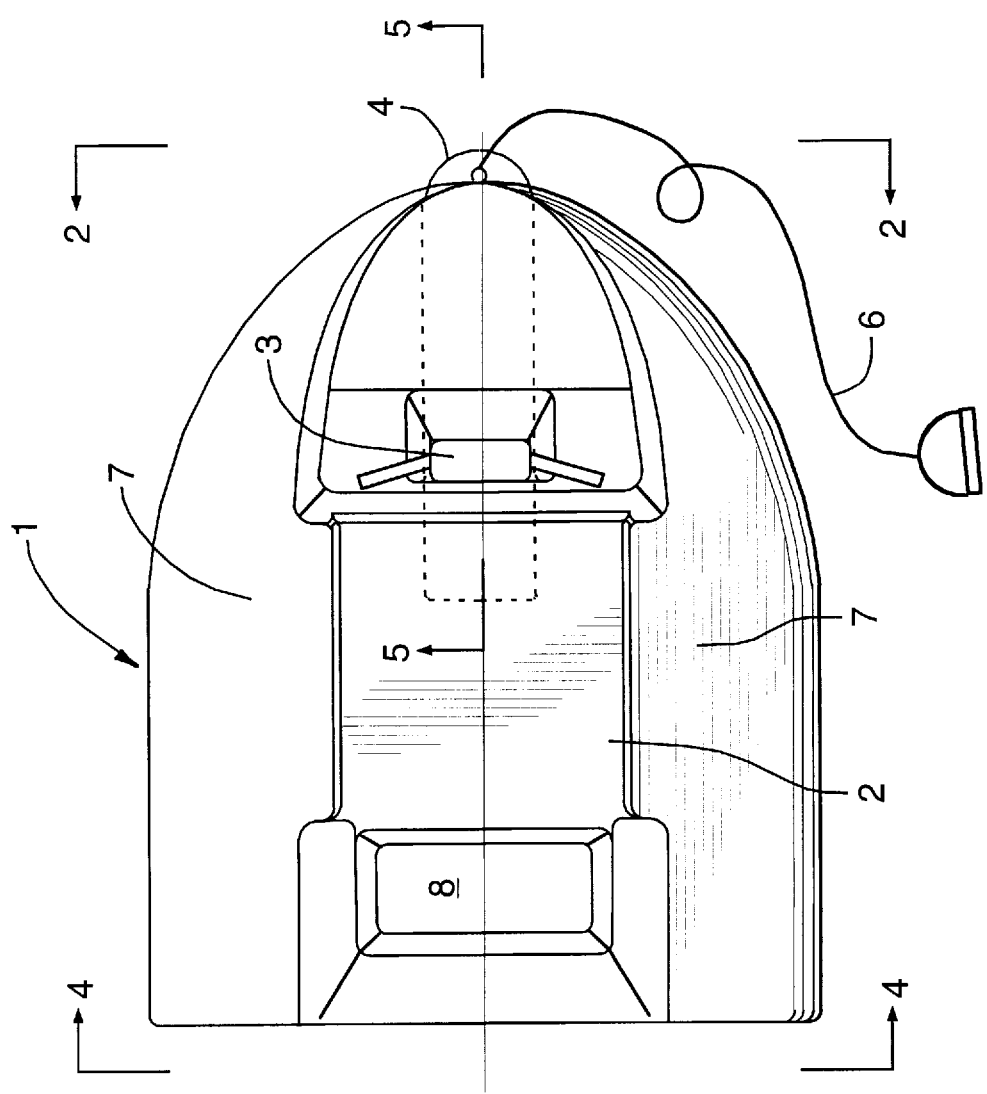
Figure 3:
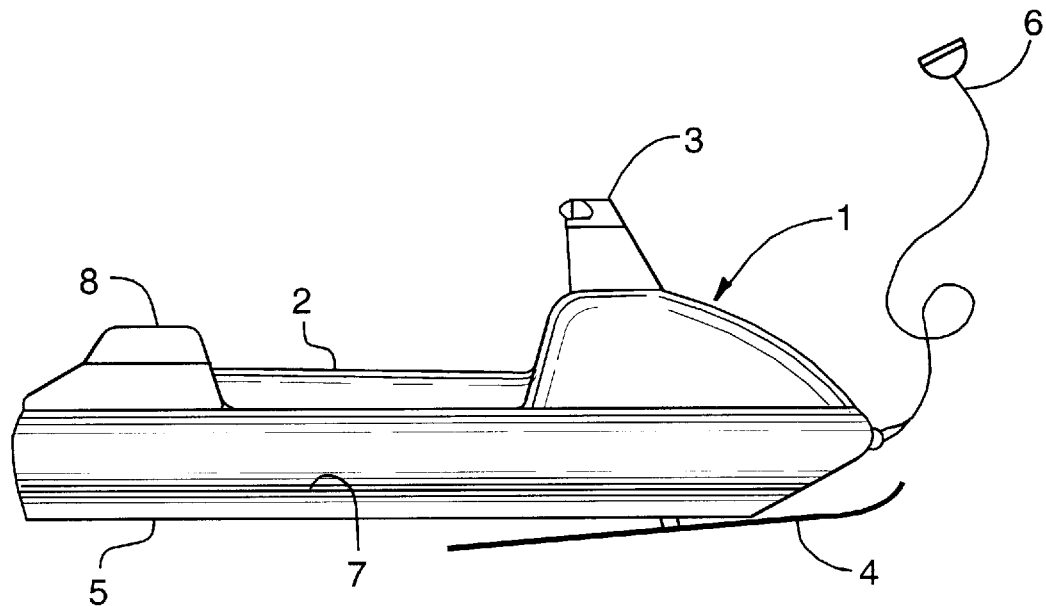
Figure 4:
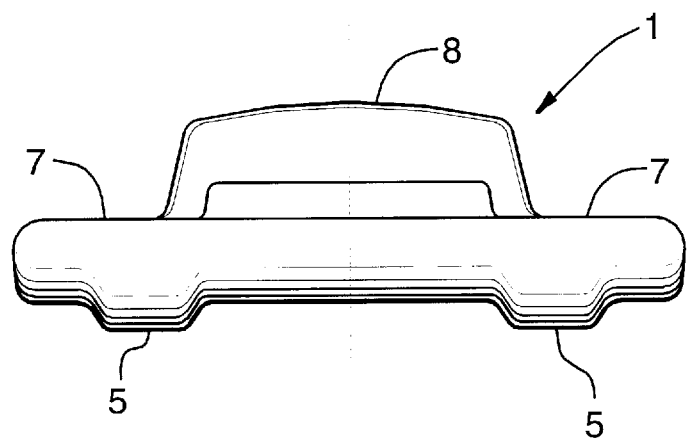

With reference to FIGS. 1–5, the preferred embodiment of the invention is illustrated in the form of an injection molded plastic hull 1 which mimics the outward shape and riding position of a snowmobile.

The toy in this configuration can be used by a child as a sled by sitting straddled on the seat bench 2, with feet resting on the foot rests 7 and holding the handle bars 3 to steer the front mounted ski 4. A back rest 8 is provided as in the real snowmobile shape, to prevent the child from sliding rearwardly off the straddle seat 2. The steering mechanism will be explained in detail below.

Sledding activity is enhanced by the provision of elongate rails 5 which project downwardly from a lower portion of the hull 1. The lightweight hull 1 with child astride the seat 2 is slidingly supported on the rails 5 during sledding down snow or ice covered hills, or when pulled along with a rope 6. The rope 6 may also be used to pull the toy behind a motorized snowmobile if desired.

Figure 6:
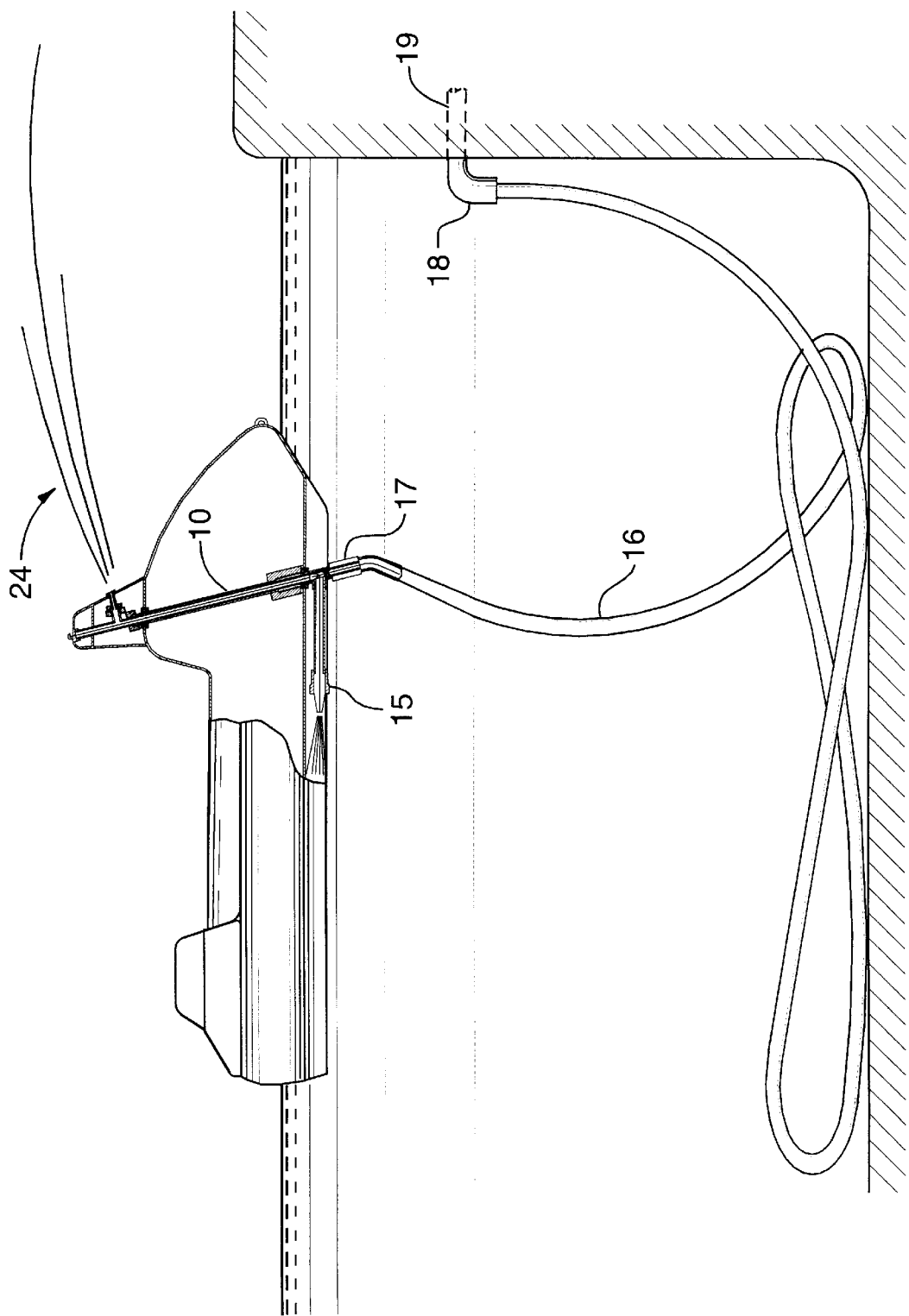
FIGS. 6–7 show the invention configured for use as a floating toy within a swimming pool, by replacing the interchangeable contact portion of the steering means from a steerable ski to a steerable water propulsion nozzle and hose.
Figure 7:
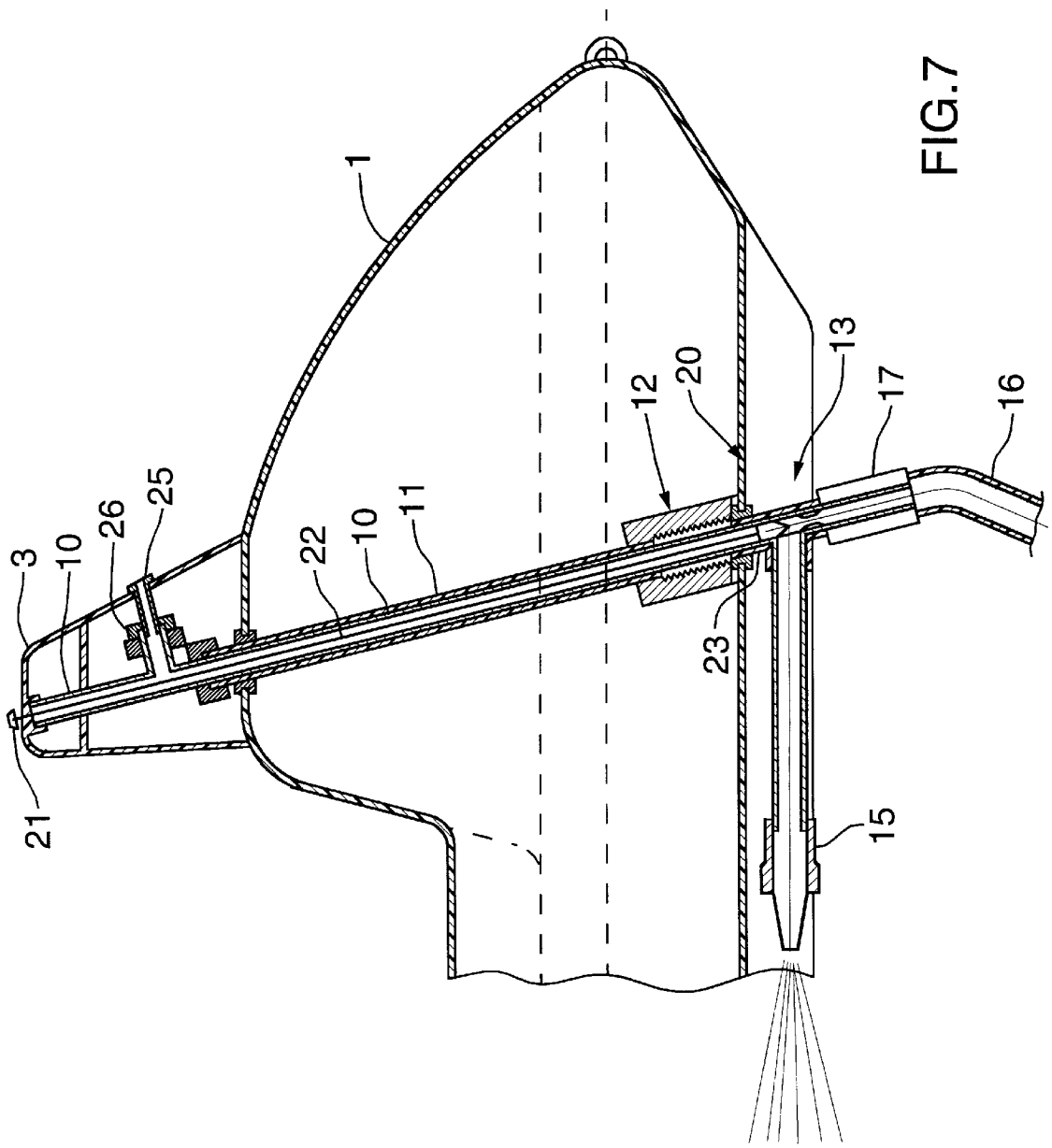

The invention as illustrated in FIGS. 6 and 7 can also be easily converted to a floating toy suitable for riding on the surface of a swimming pool. The convertable toy allows riding by at least one child, preferably two or more, while selectively floating on water and sledding. The hollow elongate hull 1 provides means for buoyantly floating the toy and child riding thereon on a water surface, and for sliding the toy and child on a frozen surface of snow or ice.

Figure 5:
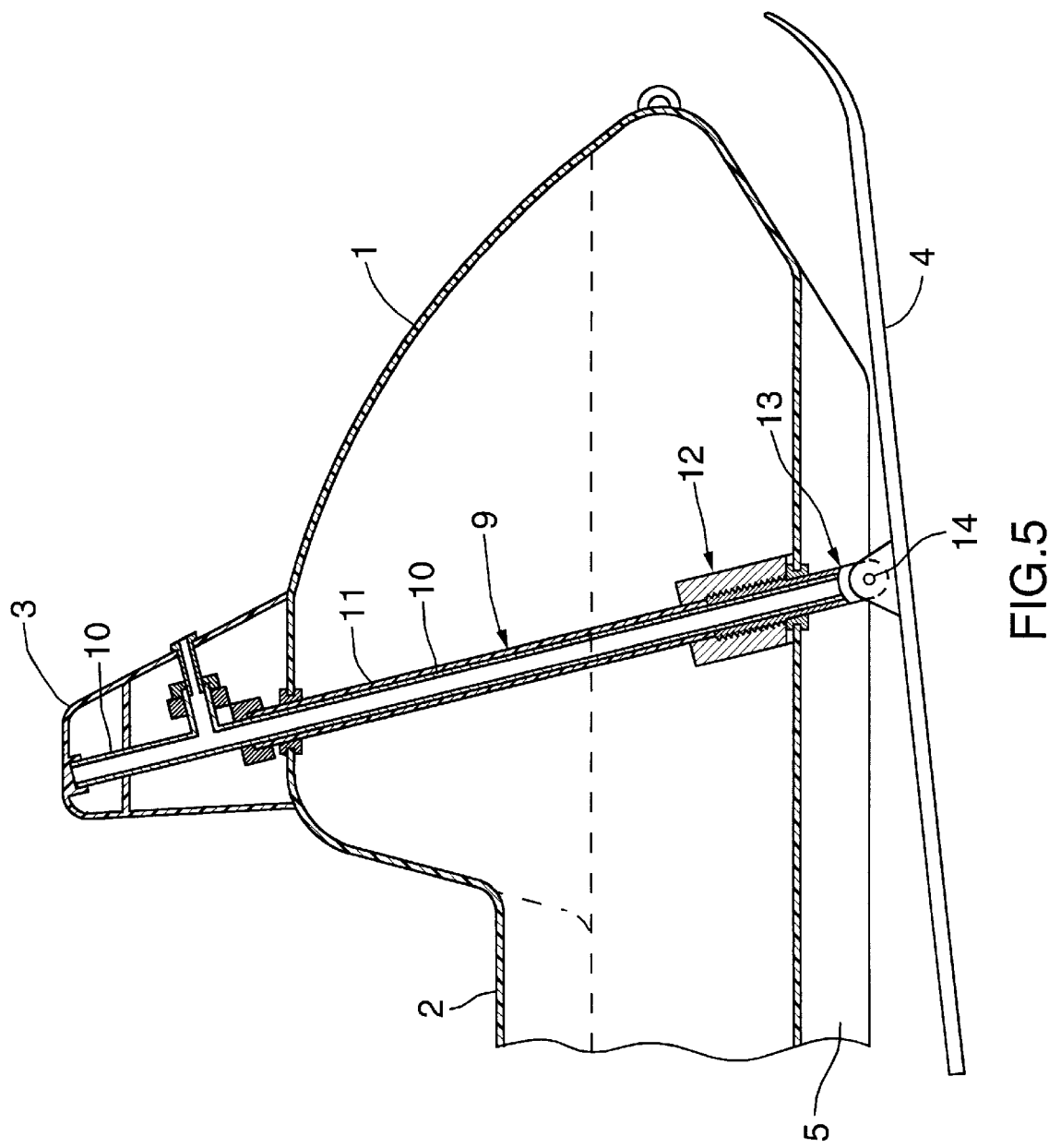

Refering to FIG. 5, steering means 9 are housed within the hull 1 for steering the direction of the toy by the child. The steering means 9 include a common human interface portion illustrated in the form of handle bars 3 connected to the upper end of a steering shaft 10. The shaft 10 is a hollow tube journalled within the hull 1 in a smooth plastic sleeve 11.

The lower end of the steering shaft 10 includes quick release mounting means 12 illustrated in the form of a threaded joint. Other suitable mounting means such as bayonet mounts etc. are well within the contemplation of the invention, however for simplicity a threaded joint is shown. Releasably connected to the steering shaft 10 with mounting means 12 is an interchangeable contact portion 13. The contact portion 13 is so called since it contacts the medium on which the toy is riding such as water or snow. The contact portion 13 can be interchangably selected from the water propulsion means shown in FIGS. 6–7, and a ski 4 shown in FIGS. 1–5.

In the case of a sledding configuration shown in FIGS. 1–5, the interchangeable contact portion 13 of the steering means 9 is a ski 4, and the mounting means 12 include a hinge 14 to conform to varying terrain as in the real version of a snowmobile. Springs or shock absorbers may also be included, however such refinements add cost and risk of breakdowns.

Turning to the floating configuration shown in FIGS. 6–7, the contact portion 13 of the steering means 9 comprises means to propel the floating toy on a water surface. A water jet nozzle 15 is mounted to the shaft 10 with the same threaded mounting means 12. A flexible hose 16 has a first end releaseably connected to the nozzle 15 with a quick release connector 17 and a second end releasably connected with a like connector 18 to an external source of pressurised water. Suitable sources of pressurized water are the water filtration system of a swimming pool 19, or a garden hose, not shown.

As shown in FIG. 7, the water propulsion means preferably includes a velocity control valve 20 for manually controlling the flow of water to the water jet nozzle 15, by raising or lowering the knob 21 or similar device on the handle bars 3. The knob 21 is attached to the upper end of a thin rod 22 which is connected at a lower end to a valve plug 23.

The flexible hose 16 has a mass sufficient to sink the immersed hose 16 to the bottom of the swimming pool as illustrated in FIG. 6. The conectors 17 and 18 include spinning coupler means for allowing the toy to spin relative to the hose 16, as are commonly used for pool cleaning accessories. These features help prevent the hose 16 from becoming a hazard to swimmers, and especially small children.

To provide capability for a spray of water 24, the mounting means 12 also includes means for conveying water from the hose 16 to the hollow shaft tube 10 via a small channel through the valve plug 23 to bypass the velocity control valve 20. The handle bars 3 include a water spray nozzle 25 and spray control valve 26 for manually controlling the water spray nozzle 25.

By removing the hose 16, the floating toy may also be pulled behind a motor boat by the front mounted rope 6.

Although the above description and accompanying drawings relate to specific preferred embodiments as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A convertible toy for riding by at least one child while selectively floating on water and downhill sledding, the toy comprising:

elongate hull means for buoyantly floating the toy and child riding thereon on a water surface, and for sliding the toy and child downhill on a frozen surface; and steering means housed within the hull for steering the direction of the toy by said child, the steering means including a common human interface portion releaseably connected with mounting means to an interchangeable contact portion, the contact portion being selected from the group consisting of: water propulsion means; and a snow riding ski, wherein the water propulsion means comprises: a water jet nozzle mounted to the interface portion of the steering means; and a flexible hose, a first hose end releaseably connectable with the nozzle and a second hose end releasably connectable to an external source of pressurized water.

2. A toy according to claim 1 wherein the water propulsion means comprises velocity control valve means for manually controlling the flow of water to the water jet nozzle.

3. A toy according to claim 1 wherein the second end of the hose is releaseably connectable to the water filtration system of a swimming pool.

4. A toy according to claim 3 wherein the flexible hose has a mass sufficient to sink the immersed hose to the bottom of a swimming pool.

5. A toy according to claim 4 wherein the hose includes spinning coupler means for allowing the toy to spin relative to the hose.

6. A toy according to claim 1 wherein the interchangeable contact portion of the steering means is a snow riding ski, and the mounting means comprise a hinge.

7. A toy according to claim 1 wherein the interface portion comprises: a steering shaft journaled within the hull, the mounting means being disposed at a lower end of the steering shaft.

8. A toy according to claim 7 wherein the interface portion comprises: a handle bar connected to an upper end of the steering shaft.

9. A toy according to claim 8 wherein the shaft comprises a hollow tube, the water propulsion means comprises: a water jet nozzle mounted to the interface portion of the steering means; and a flexible hose, a first end releaseably connectable with the nozzle and a second end releaseably connectable to an external source of pressurized water, the mounting means including means for conveying water from the hose to the tube, the interface portion including a water spray nozzle and spray control valve means for manually controlling the water spray nozzle.

10. A toy according to claim 1 wherein the hull includes elongate rail means, projecting downwardly from a lower portion thereof, for slidingly support the hull during sledding.

11. A toy according to claim 1 wherein the hull is constructed of injection molded plastic.

12. A toy according to claim 11 wherein the hull includes foot rests and a straddle seat.

13. A toy according to claim 12 wherein the hull includes a back support.

* * * * *